Aug. 3, 1926.
C. A. MATSON
1,594,971
LACE TIPPING MACHINE
Filed June 12, 1925    12 Sheets-Sheet 5
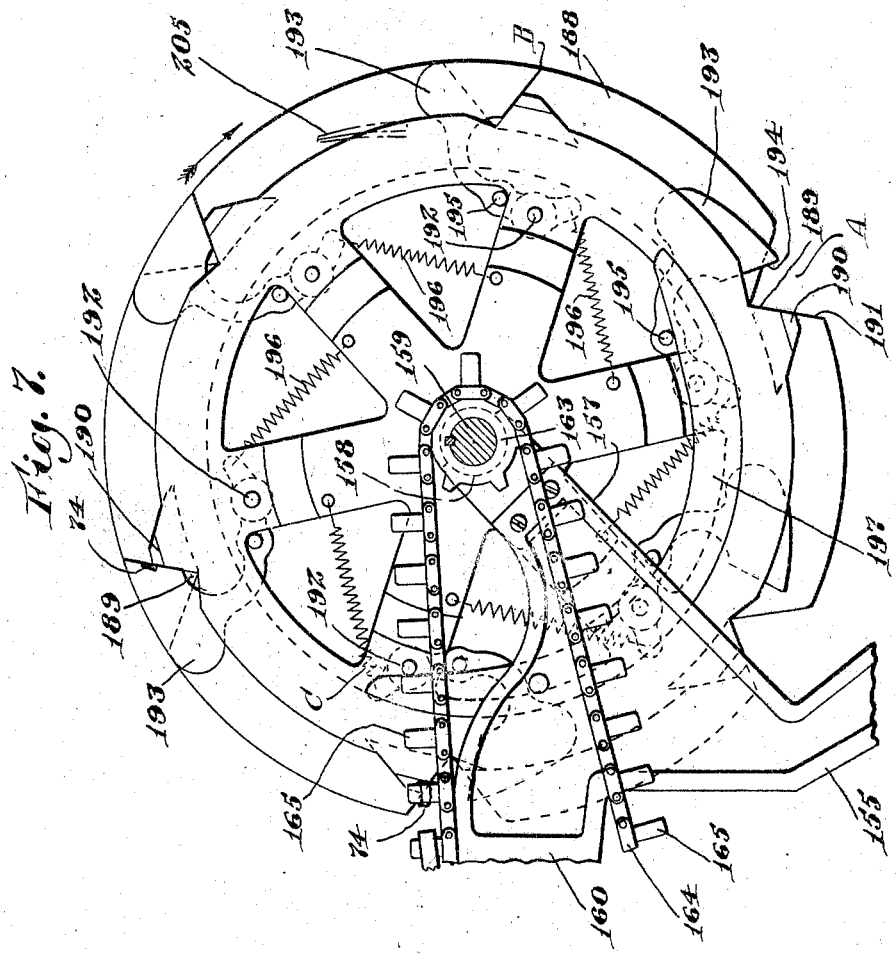
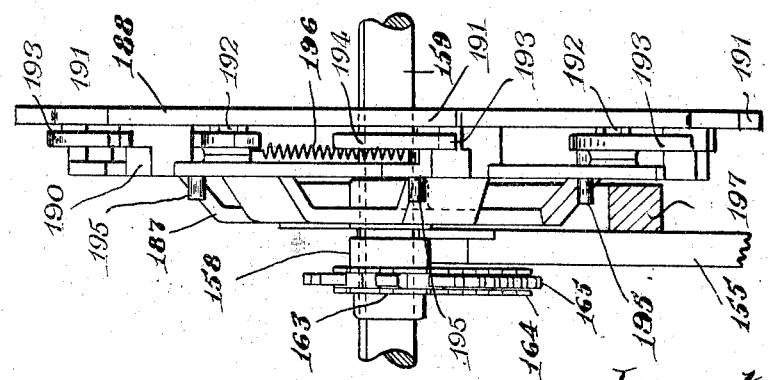
Inventor
Carl A. Matson
by James R. Hodder
Attorney Aug. 3, 1926.
C. A. MATSON
1,594,971
LACE TIPPING MACHINE
Filed June 12, 1925     12 Sheets-Sheet 6
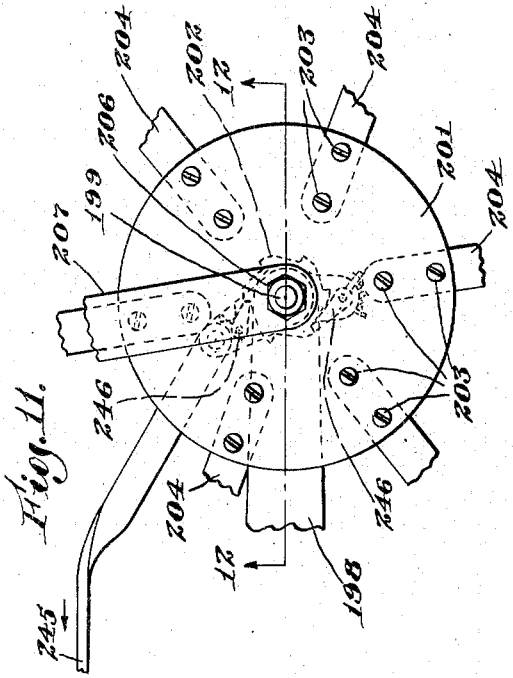
Fig. 11.
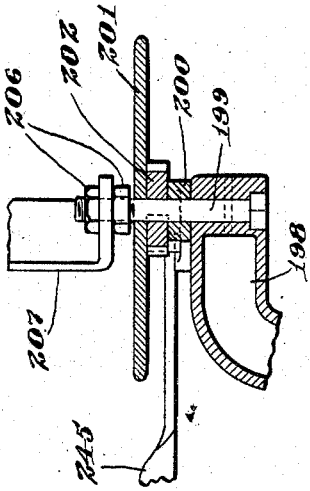
Fig. 12.
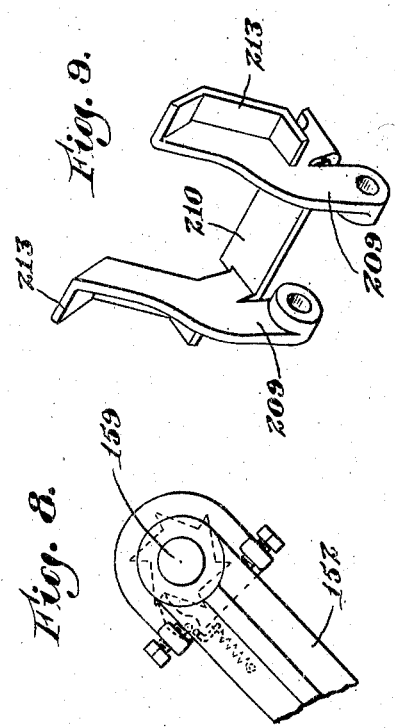
Fig. 9. Fig. 10. Fig. 8.
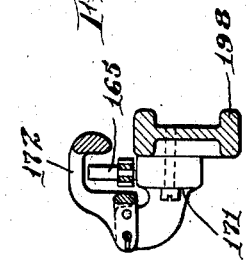
Inventor
Carl A. Matson
by James R. Hodder
Attorney

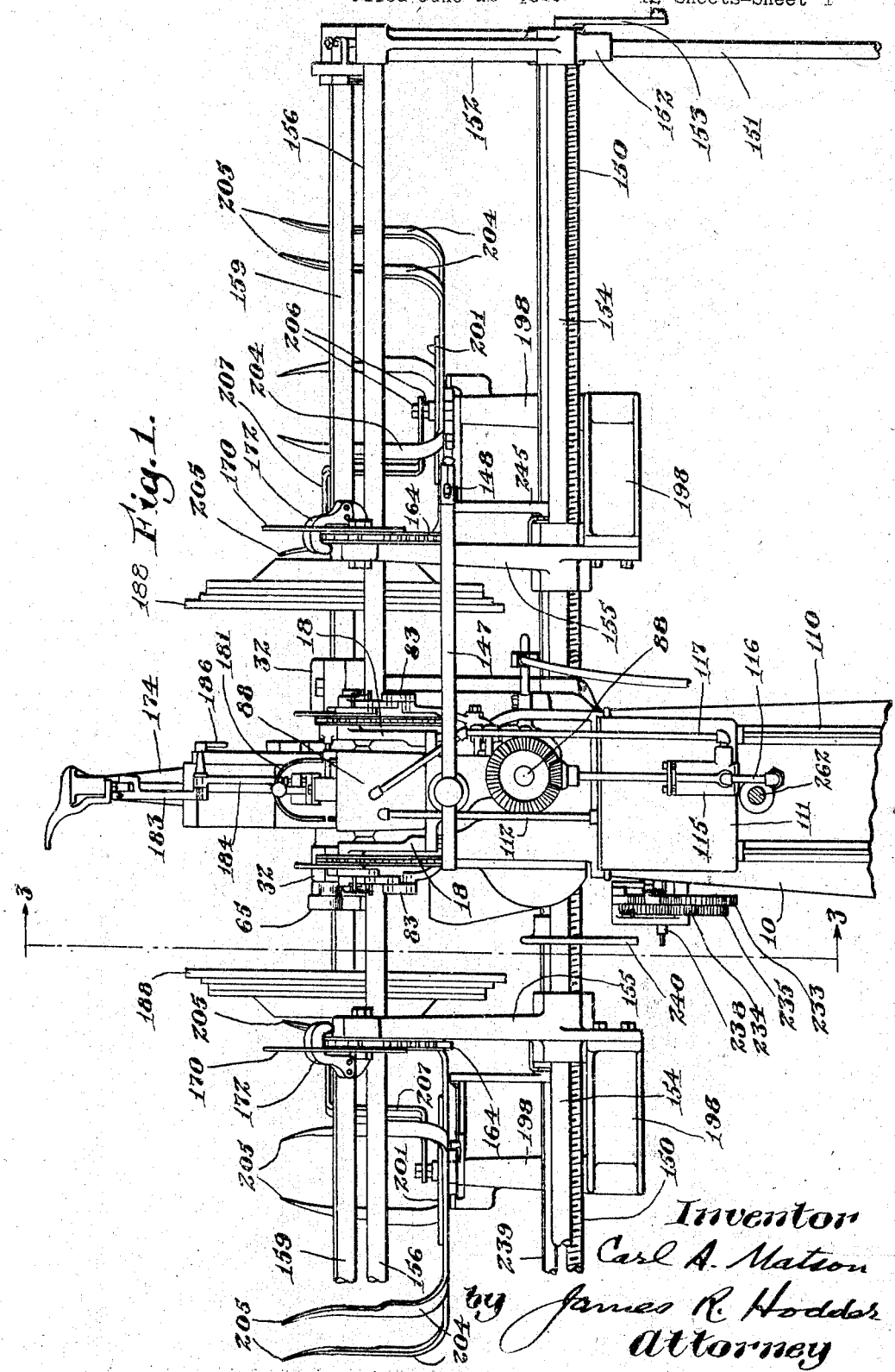

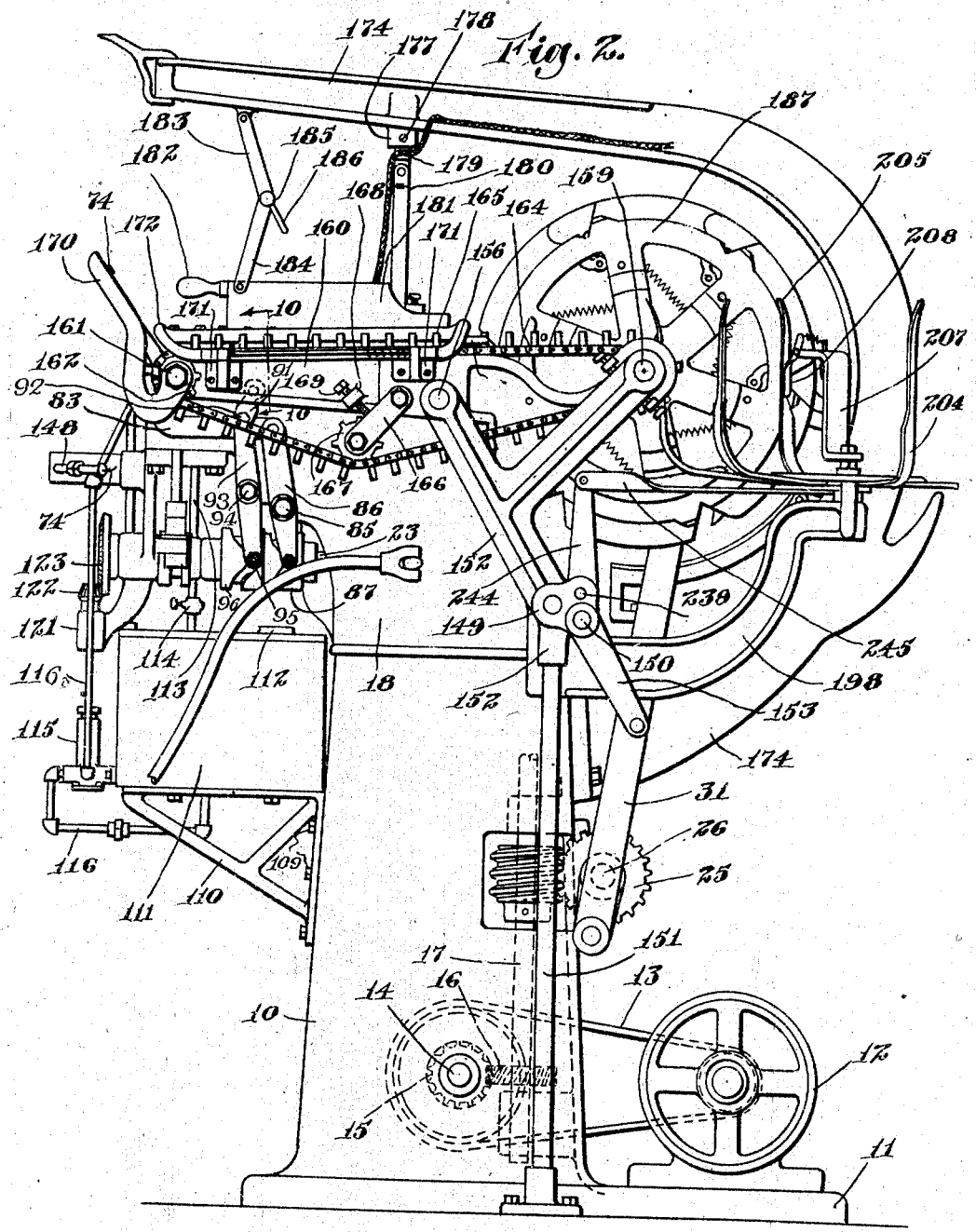

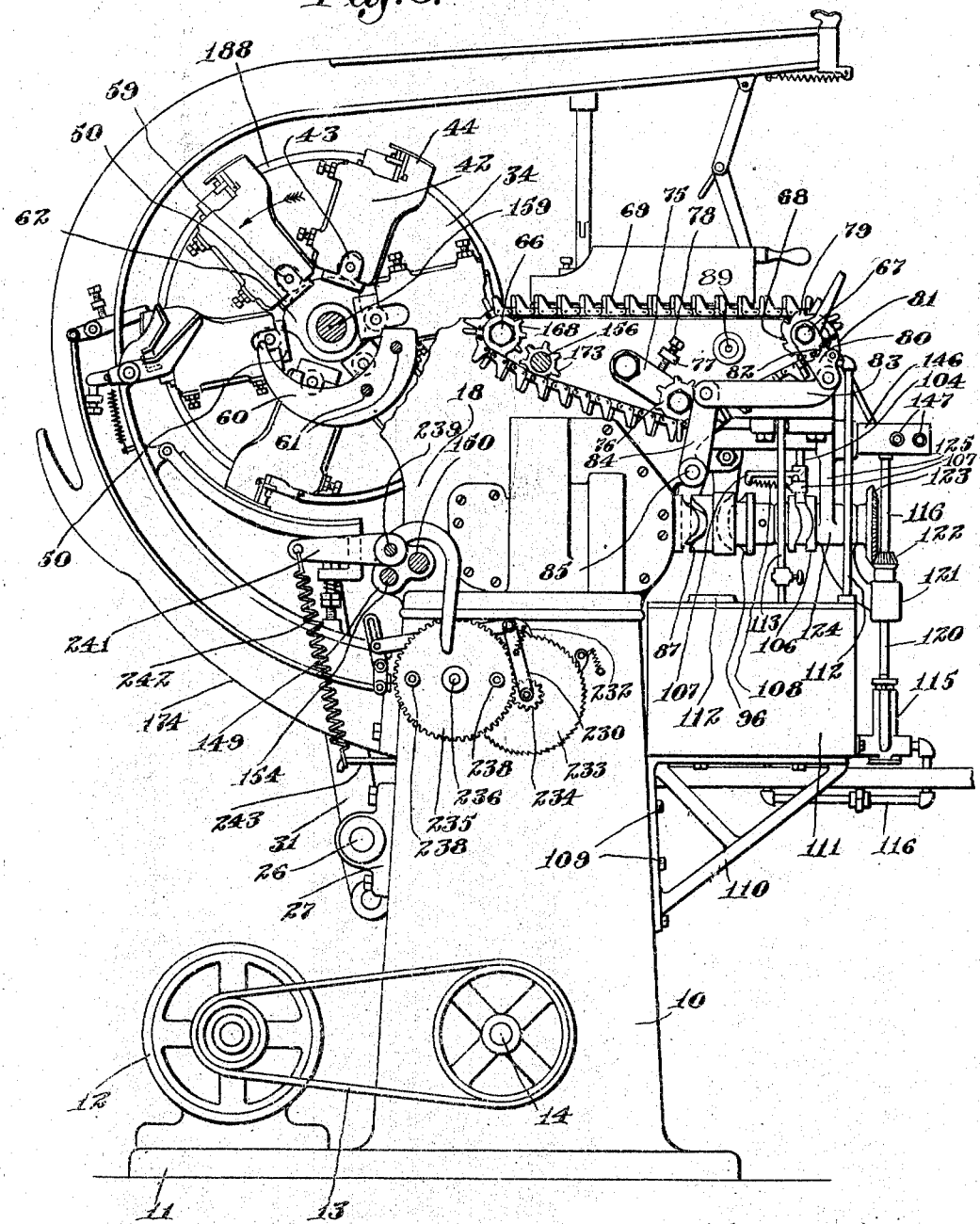

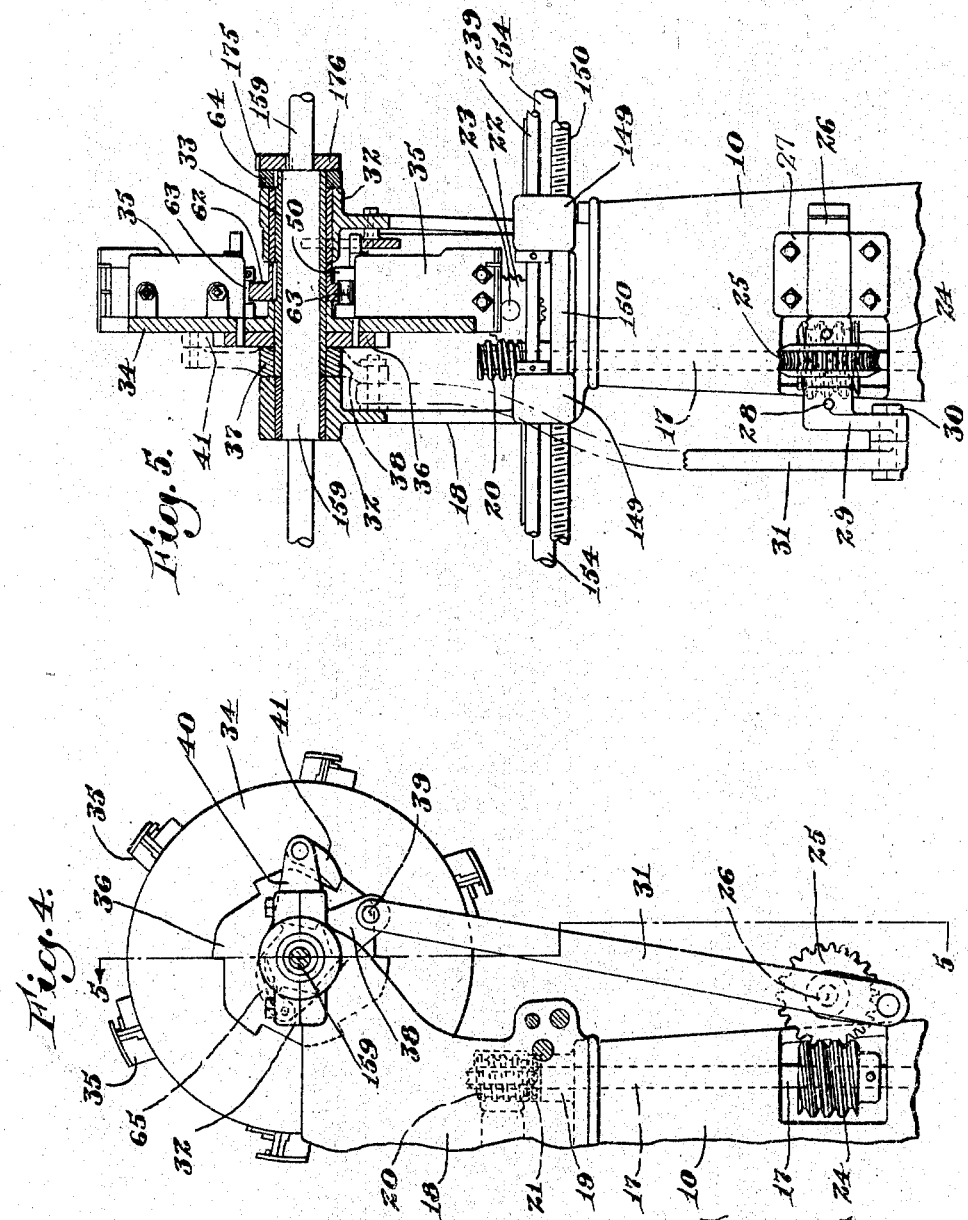

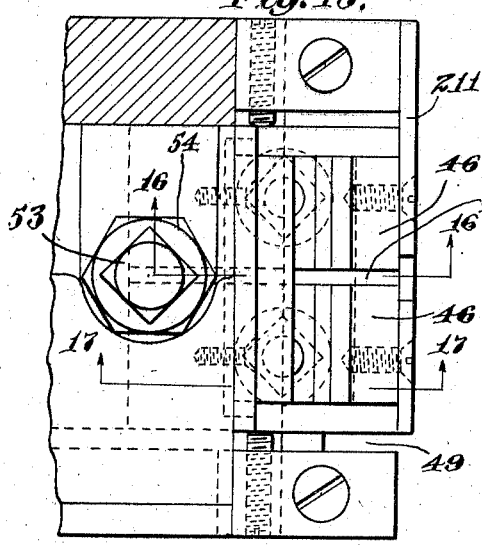
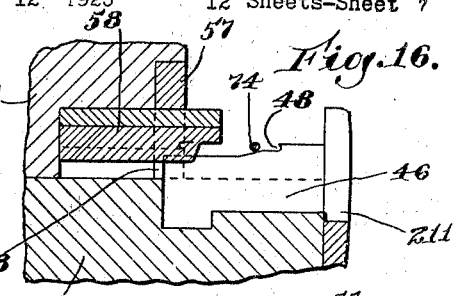
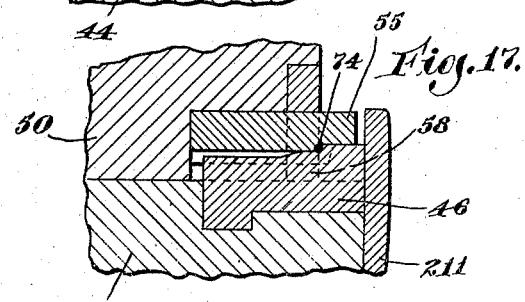
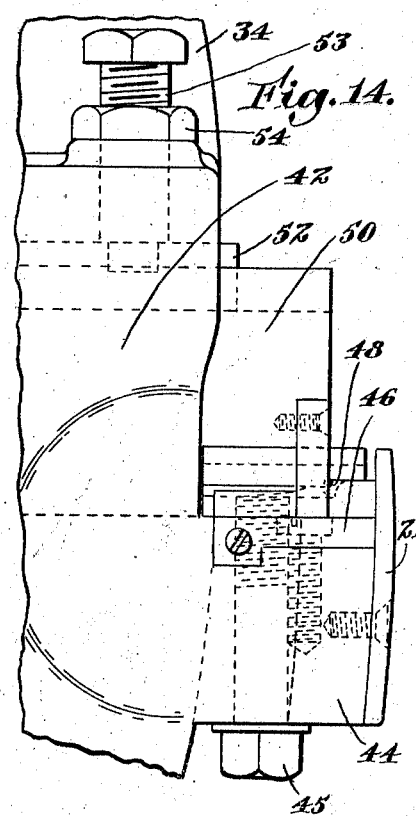
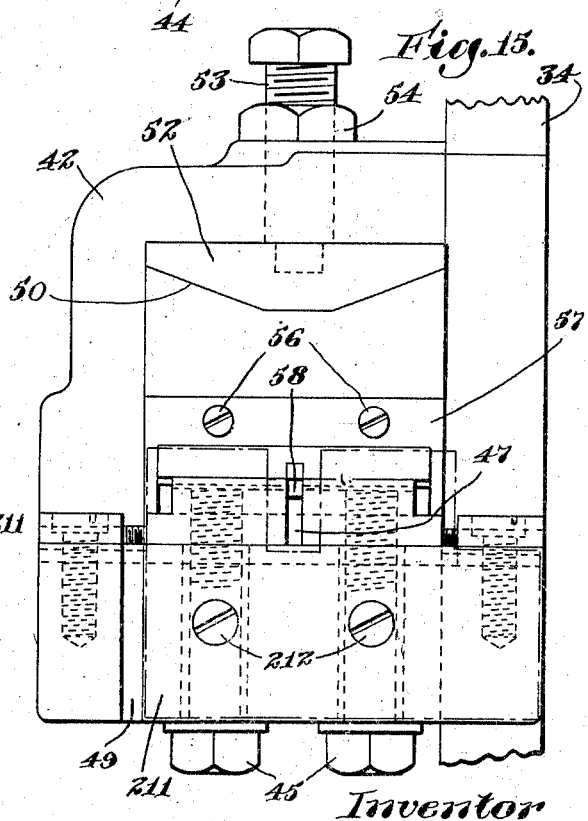

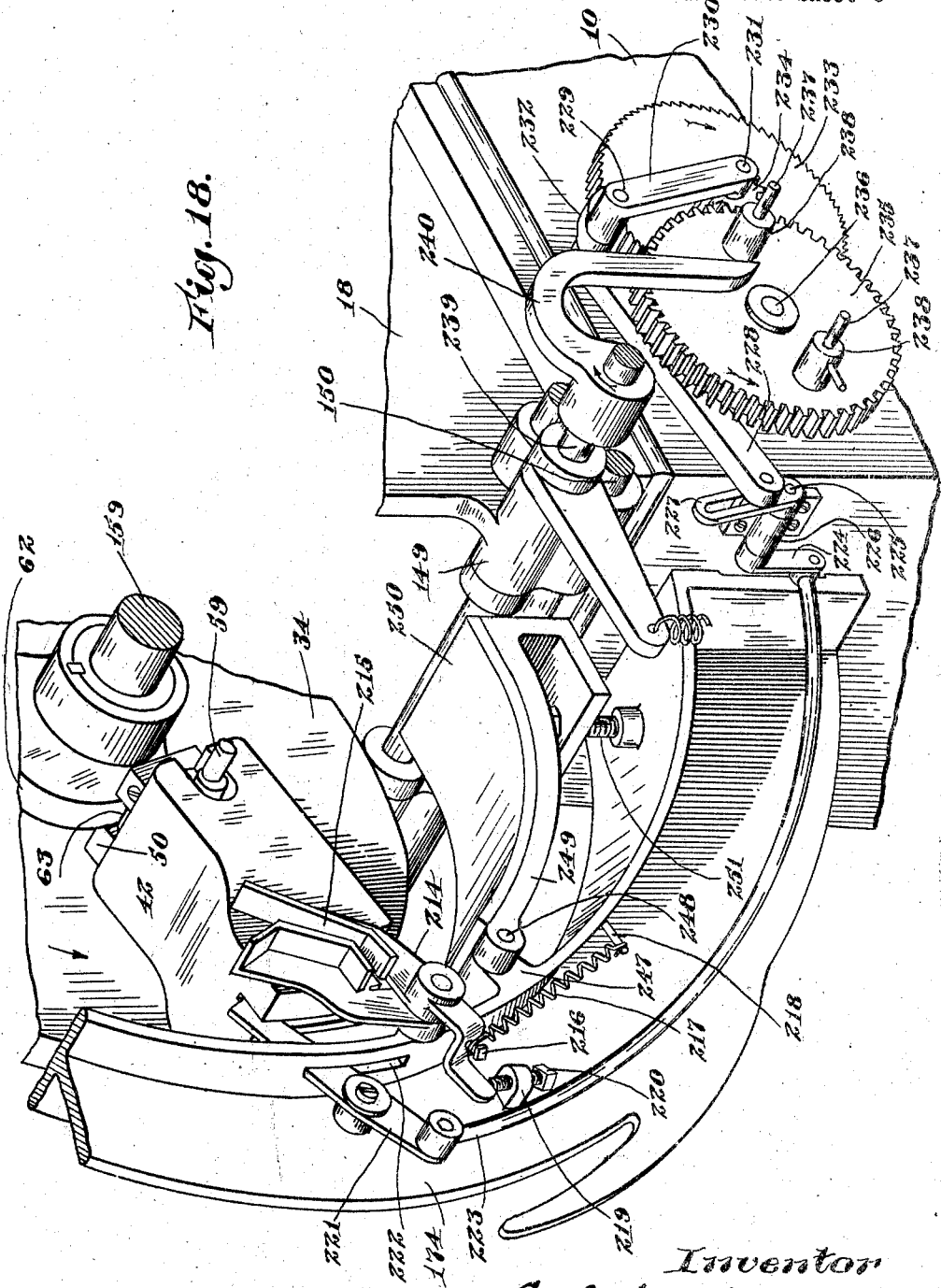

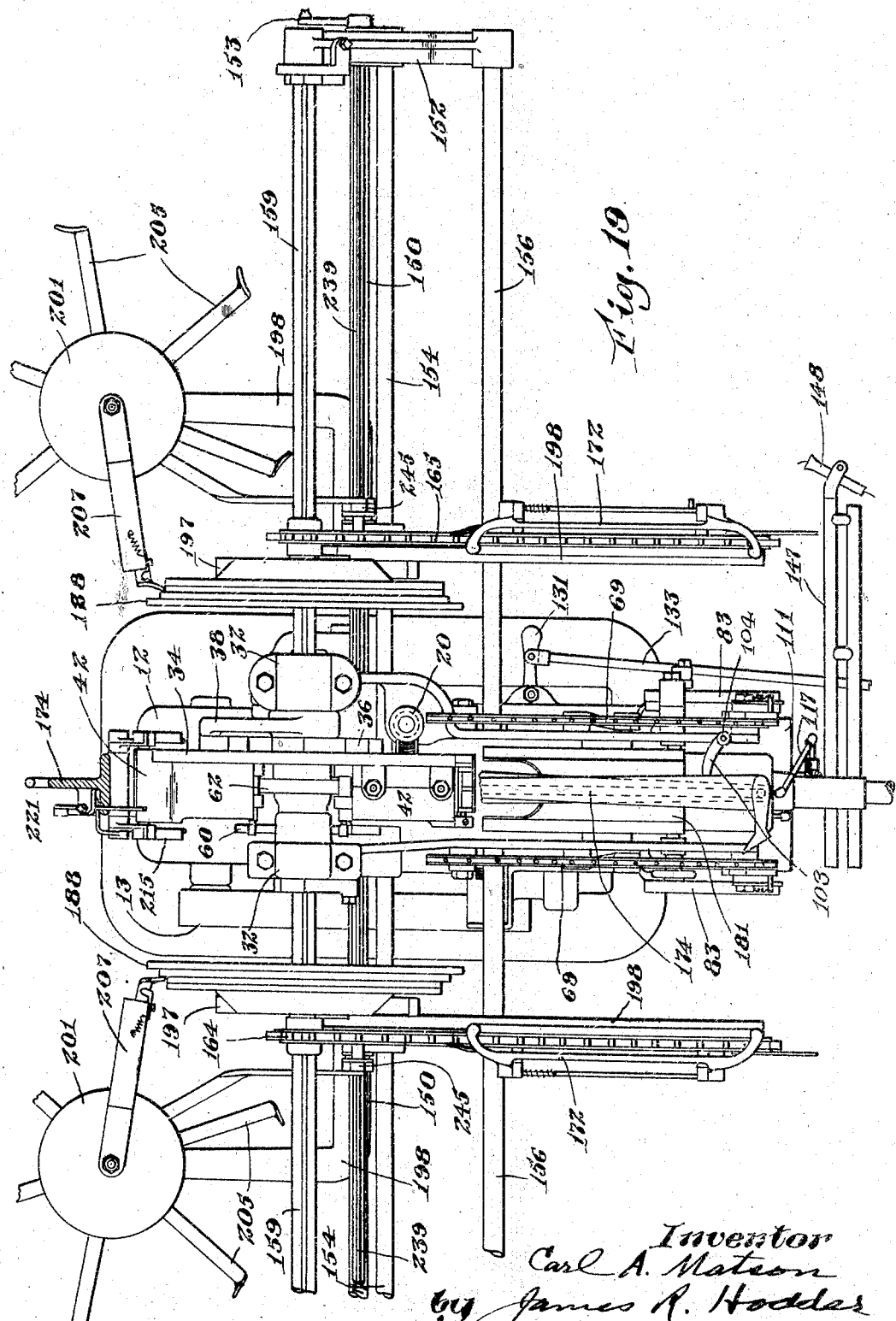

Aug. 3, 1926.  
C. A. MATSON  
1,594,971  
LACE TIPPING MACHINE  
Filed June 12, 1925    12 Sheets-Sheet 10
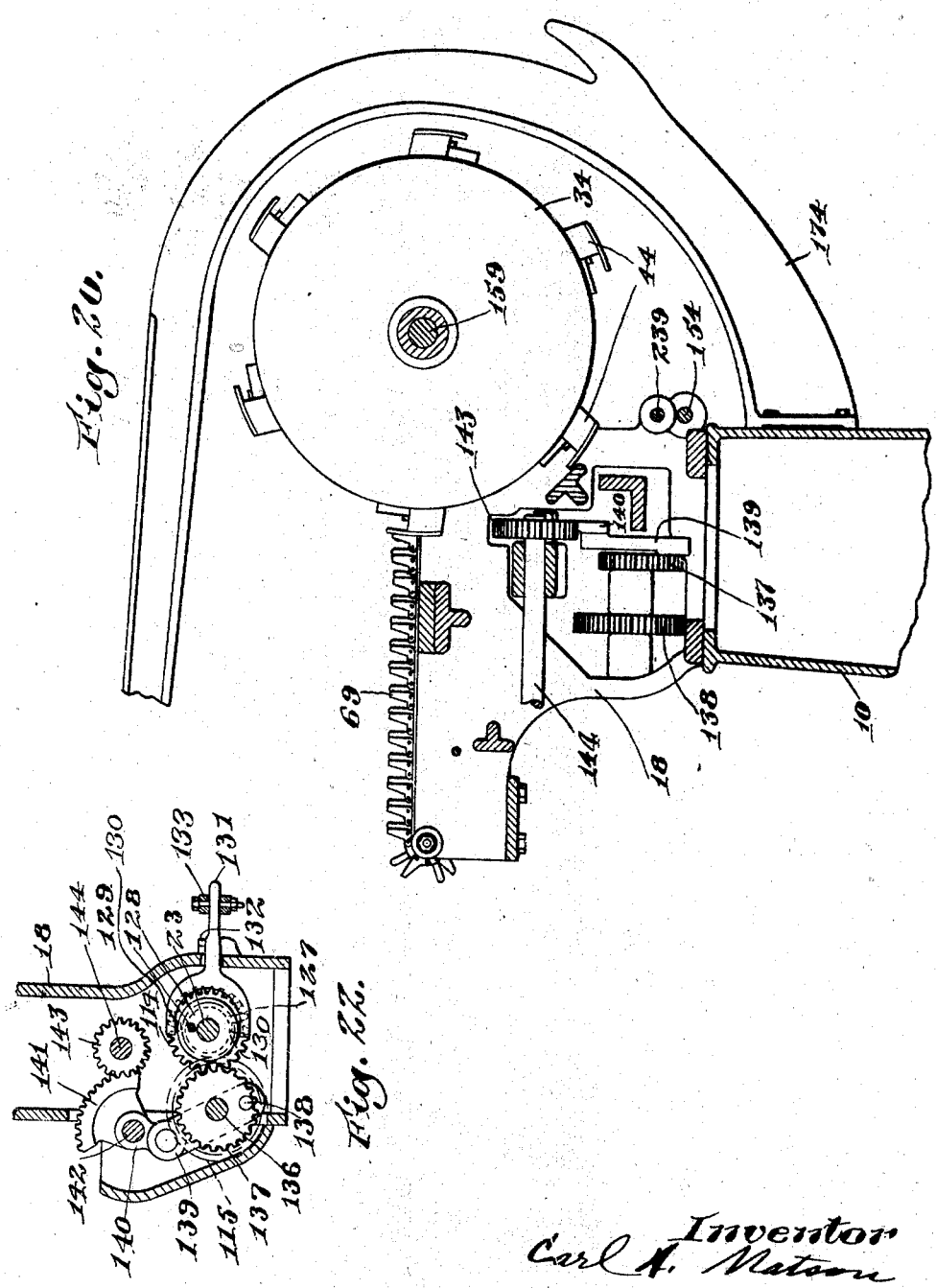

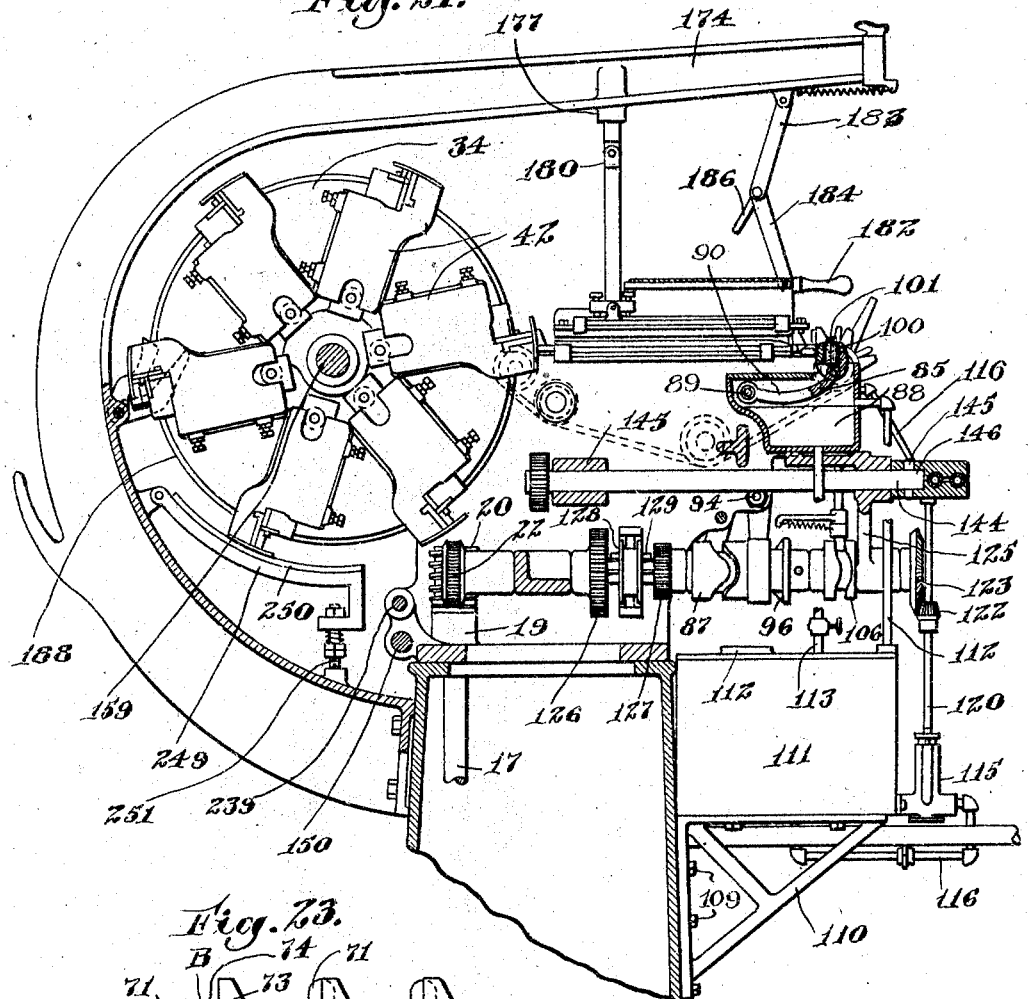
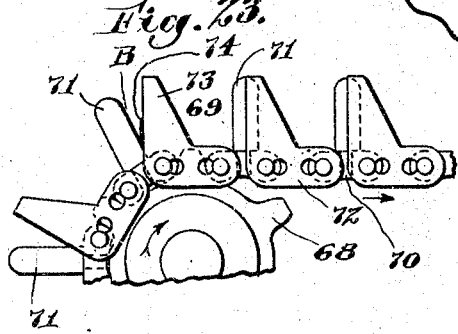
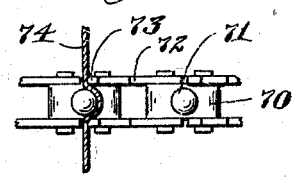

Patented Aug. 3, 1926.

1,594,971

UNITED STATES PATENT OFFICE.

CARL A. MATSON, OF CHELSEA, MASSACHUSETTS, ASSIGNOR, BY MESNE ASSIGNMENTS, TO SHOE LACE COMPANY, LTD., OF PROVIDENCE, RHODE ISLAND, A CORPORATION OF RHODE ISLAND.

LACE-TIPPING MACHINE.

Application filed June 12, 1925. Serial No. 36,667.

My present invention relates to lace tipping machines, and more particularly to an improved lace tipping machine for simultaneously tipping the ends of a plurality of laces and for measuring the length of such laces.

In my copending application, Serial No. 665,338, filed Sept. 28, 1923, I have described and claimed an improved machine for tipping laces and for measuring the length of such laces. My present machine is an improvement of the machine above referred to and has been designed with the object in view of increasing the output of this class of machines.

One of the objects of my invention is an improved means for holding the loop ends of the lacing of indeterminate length, as the same is fed to the machine, whereby the arms hitherto considered necessary have been dispensed with. In carrying out this object I provide on each side of the machine and adapted to be adjusted toward and from the tipping instrumentalities, chains provided with outwardly extending spaced teeth, the chains moving in synchronism with each other and also moving in synchronism with the gripping chains that feed the lacing through the tipping instrumentalities, this resulting in a more compacted and more easily adjustable machine and one capable of higher speed of operation without danger of derangement by the catching of the loops of the lacings.

In connection with the looping chains above referred to, I have designed an improved pick up dog, one of which is located on each side of the machine, and which act to pick off the loops of the lacings from the chains as the lacing is fed through the machine.

Another important feature of my invention is a novel form of mounting mechanism operating in conjunction with the rotary die head, and also associated with the mounting mechanism and loop carrying chains is an improved form of collecting device.

In the operation of the machine forming the subject matter of my copending application above referred to, it was found that difficulty was experienced in maintaining a suitable level of the impregnating material in the tank, and in my present invention I have obviated this difficulty by the provision of a supply tank from which solution is being constantly fed by a power driven pump to the tank associated with the impregnating device, the supply tank and pump, together with the tank associated with the impregnating material is maintained in the last mentioned tank.

Various other features of construction and operation of parts comprising my invention will be apparent as the description of the invention progresses.

In the accompanying drawings illustrating the preferred embodiment of my invention:—

Fig. 1 is a front elevation;
Fig. 2 is a left hand elevation;
Fig. 3 is a sectional side elevation on the line 3—3 of Fig. 1;
Fig. 4 is an enlarged detail of the driving mechanism for the rotary die carrier;
Fig. 5 is a sectional elevation on the line 5—5 of Fig. 4.
Fig. 6 is a front elevation of the feed wheel;
Fig. 7 is a side elevation of Fig. 6;
Fig. 8 is an enlarged fragmentary detail of the die carrier stop mechanism;
Fig. 9 is a perspective view of the stripper fingers associated with the die carrier;
Fig. 10 is a sectional elevation on the line 10—10 of Fig. 2;
Fig. 11 is a fragmentary detail enlarged elevation of a portion of the operating mechanism;
Fig. 12 is a sectional elevation on the line 12—12 of Fig. 11;
Fig. 13 is a plan view of one of the dies in position in a die carrier;
Fig. 14 is a side elevation of Fig. 13;
Fig. 15 is a front elevation of Fig. 13;
Fig. 16 is a sectional elevation on the line 16—16 of Fig. 13;
Fig. 17 is a sectional elevation on the line 17—17 of Fig. 13;
Fig. 18 is a perspective view of a portion of the die carrier showing the tripping mechanism and the mechanism for operating the counting device;
Fig. 19 is a plan view of the machine;
Fig. 20 is a vertical section on various undefined lines designed to show certain features of construction;

Fig. 21 is a vertical central sectional elevation with the die turret shown in elevation;

Fig. 22 is a sectional detail showing the clutch and arm driving mechanism;

Fig. 23 is an enlarged detail showing the chain feeding device;

Fig. 24 is a plan view of Fig. 23, and

Fig. 25 is an elevation of the entire machine.

Figure 75:
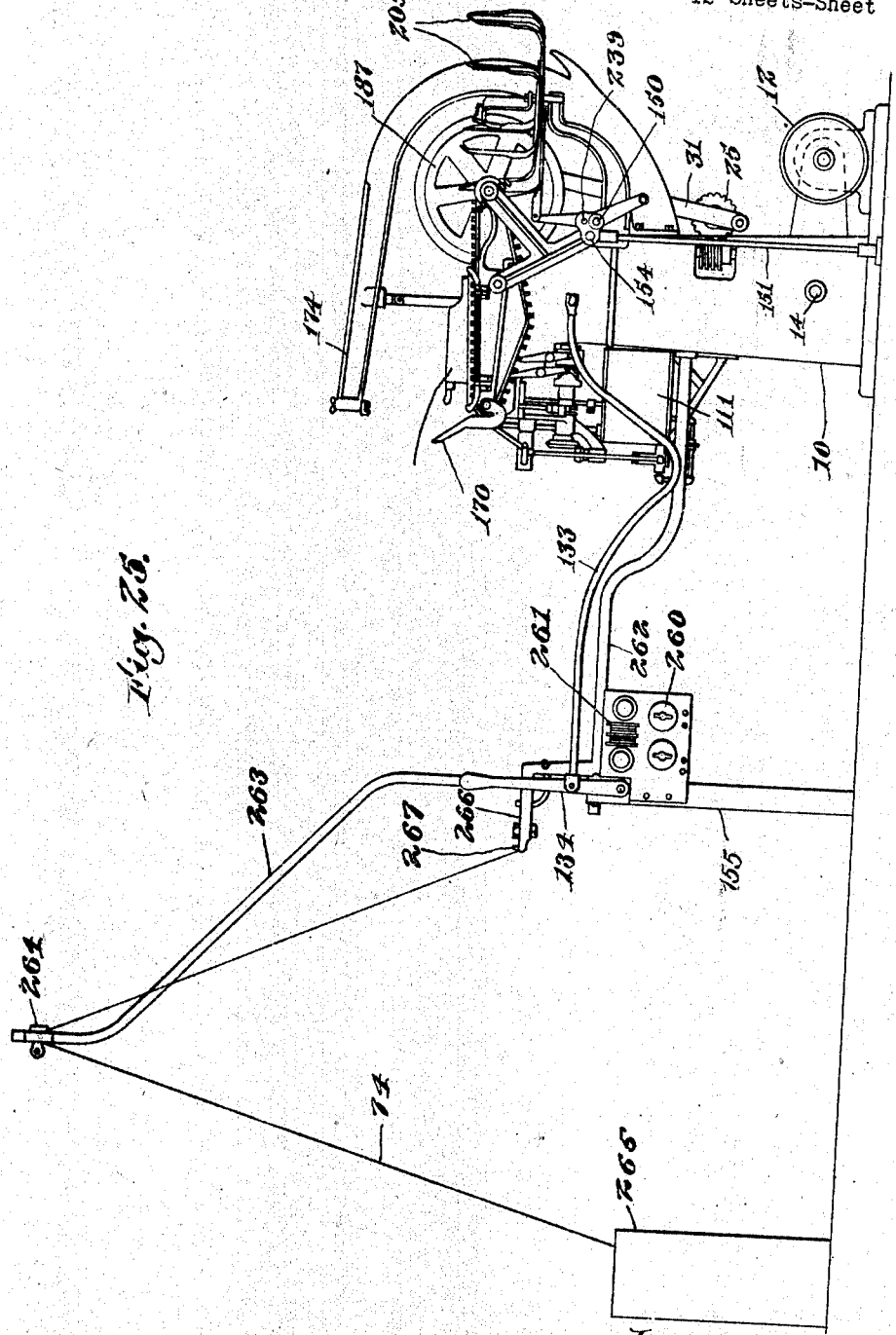

Referring to the drawings, 10 designates a base on an extension 11 of which is mounted a driving motor 12 which, by means of a belt 13, transmits power to a horizontally mounted shaft 14 to which is secured a spiral gear 15 which meshes with, and drives, a corresponding spiral gear 16 secured adjacent to the lower end of a vertically mounted shaft 17. This shaft 17 is vertically mounted in suitable bearings in the interior of the base 10. Secured to the top of the base or casing 10 is a casing 18 and on which is mounted the working parts of the apparatus. The shaft 17 extends upwardly through the base 10 and through the casing 18, a bearing 19 being provided in such casing to support the upper end of the shaft. Secured to the upper end of the shaft 17 is a worm 20, and between the lower end of the worm 20 and the upper end of the bearing 19 is provided an anti-friction thrust bearing 21. The worm 20 meshes with, and drives, a worm wheel 22 mounted on a shaft 23 that is, in turn, rotatably mounted in suitable bearings in the casing 18. The shaft 23 extends through the casing and is provided with operating mechanisms that will be hereinafter described in detail.

Secured to the shaft 17 intermediate the ends thereof is a worm 24 which meshes with, and drives, a worm wheel 25 that is secured to a shaft 26. This shaft 26 is rotatably mounted in a suitable bearing block 27 secured to the casing 10. Formed on one end of the shaft 26, or secured thereto in any suitable manner, as by a pin 28, is a crank arm 29. This arm is provided at its free end with a crank pin 30 and on the crank pin 30 is pivotally attached the lower end of a connecting rod 31. Formed on the casing 18 at the upper end thereof and extending outward therefrom are bearings 32 spaced apart from, and in alignment with, each other, and rotatably mounted in said bearings is a hollow shaft 33. Rotatably mounted on the hollow shaft 33 between the bearings 32 is a circular plate 34 to one face of which are secured radially extending die members 35. Secured to the opposite face of the circular plate 34 is a ratchet 36, this ratchet being provided with teeth equal in number to the number of radially placed dies 35. Rotatably mounted on the shaft 33 is a member 37 having formed therein a radially extending arm 38, the free end of this arm being provided with a pin or shaft 39 and on which pin is pivotally attached the upper end of the connecting rod 31. Also formed integral with the member 37 is a radially extending arm 40, and pivotally attached to the outer end of said arm 40 is a pawl 41 which meshes with the teeth in the ratchet 36. It is obvious from the above description that, if the shaft 17 is rotated, the shaft 26 will also be rotated by the worm 24 and worm wheel 25 and that the connecting rod will impart an oscillatory movement to the member 37 and will cause a step by step rotary movement of the die carrying circular plate 34 in the direction of the arrow shown in Fig. 4.

Each of the dies referred to is comprised of a hollow body member 42 having one face thereof provided with a slot or groove 43 and the lower outer end of the member 42 has formed thereon an extension 44 on the top face of which is secured by bolts 45 die plates 46, a pair of these plates being provided and the plates are separated from each other to provide a space or slot 47 therebetween. The upper faces of the die plates are each provided with a groove 48 in alignment with each other and which forms a hook or seat in which the portion of the lacing which is to be tipped may be fitted. On the side or end of the member 44 remote from the circular plate 34 and adjacent to the outermost die plate 46 is arranged a slot 49 for a purpose to be herein after described. Slidably mounted in the interior of the member 42 in a direction toward and from the die plates 46 is a member 50, the upper end of which is provided with a substantially V-shaped member 52 provided with depressions on its upper surface in which engage the adjusting screws 53. These adjusting screws 53 screw through one face of the member 42 and serve to hold the member 42 in adjusted position relative to the sliding member 50, check nuts 54 being provided on the screws 53 for holding the same in adjusted position. The lower forward end of the member 50 is cut away to receive the dies 55, there being one of such dies 55 for each of the cooperating die members 46. Secured to the lower front face of the member 55 by screws 56 is a plate 57, this plate having formed integral therewith and extending downwardly and centrally therefrom a cutting blade 58, this blade being substantially equal to the width of the slot 47 between the die plates 46. Secured to each of the members 50 is a pin 59, which pin extends through the groove or slot 43 above described as being provided in one face of the member 42. These pins extend laterally outward from the plate or disc 34 and engage with a cam plate 60 secured to the casing member 18 by bolts or other suitable fastenings 61, as clearly shown in Fig. 3. Secured to the hollow shaft or sleeve 33 is a cam 62, and engaging with the periphery of said cam are pins or rollers 63, there being one of said pins located in each of the inner ends of the blocks 50. Secured to the hollow shaft or sleeve 33 at the end remote from the ratchet 36 is a ratchet 64 which is engaged by a pawl 65 pivotally attached to the bearing 32 adjacent thereto. The ratchet 64 and pawl 65 prevent retrograde movement of the circular plate 34 or, in other words, prevent rotary movement of the hollow shaft 33 and attached parts in any other direction than that shown by the arrow in Fig. 4. The cam 62 is so shaped as to cause the members 50 to move radially outward to bring the die members 55 thereon into engagement with their associated die members 46 during substantially half a revolution of the circular member 34, at which time, assuming the member 34 to be rotating in the direction of the arrow shown in Fig. 3, the pins 59 are engaged by the cam 60 so that, during the second half of the revolution, the members 50 are moved radially inward so as to move the die members 55 thereon out of association with the die members 46.

Rotatably mounted in the casing 18 and parallel to each other are shafts 66 and 67 to the outer ends of each of which are secured sprockets 68, the sprockets 68 on each side of the casing being in alignment with each other, and over such sprockets run feed chains 69. These feed chains are constructed of a plurality of link members 70 from each of which protrudes a cylindrical member or tooth 71. Side plates 72 connect the links 70 together, and the side plates are also provided with extensions 73 substantially equal in length to the length of the cylindrical members 71. It will be obvious from an inspection of the drawings, and assuming the sprocket 68 to be rotating in the direction of the arrow shown, that, as the chain structure moves, the cylindrical member 71 and the extension 73 on the side plates 72 are separated from each other about the pivot connection of the side plates 72 and links 70 so as to define an angular opening B therebetween, as viewed in side elevation, and into which angular opening it is possible to feed or place a lacing 74 of any length. Assuming now that the cylindrical member 71 and the extension 73 have moved from the position defined by B so as to bring the chain structure into a substantially horizontal plane, it will be evident that the angular relation of the cylindrical member 71 and extension 73 has disappeared and the lacing 74 that may have been placed in such angular space B will be held or gripped between the cylindrical member 71 and the member 73. There are two of the feed chains 69, one on each side of the casing 18, and the shafts 66 and 67 are rotated at the same speed and in the same direction because of the fact that the sprockets 68 are equal in pitch and diameter. The feed chains 69, therefore, move in synchronism and the lacings 74, having been fed to the feed chains, will be moved along by said feed chains in the direction of the intermittently rotating plate 34 carrying the die structures above described. On each side of the member 18 is arranged an adjustable arm 75 at the lower end of which is rotatably mounted an idler sprocket 76 which engages with the lower reach of the feed chains 69 and by means of which the tension of such chains may be adjusted. To enable this to be done, there is formed on each side of the casing 18 an outwardly extending lug 77 drilled and tapped to receive an adjusting screw 78, the lower end of which engages with the pivoted arm 75 to move the same downward toward the lower reach of the feed chain 69. Secured to each end of the shaft 67 is a ratchet 79. Rotatably mounted on the shaft 67 and at each end thereof is an arm 80 and on each of these arms is pivotally mounted a pawl 81 provided with a spring 82, the pawls 81 meshing with the teeth of the ratchet 79. Pivotally attached to the free ends of each of the arms 80 is one end of a link 83. Pivotally attached to the free end of one of the links 83 on one side of the casing 18 is one end of an arm 84, this arm being attached to one end of a shaft 85 that is rotatably mounted in suitable bearings in the casing 18. Secured to the free end of the link 83 on the other side of the machine is the upper end of a lever 86, this lever being secured, intermediate its ends, to the end of the shaft 85 above referred to. Rotatably mounted at the lower end of the lever 86 and extending laterally therefrom is a cam roller (not shown) which engages in the cam raise of a cam 87 secured on the shaft 23 rotatably mounted in horizontal bearings in the casing 18.

Secured to the casing 18 between the chains 69 is a tank 88 in which is placed any suitable molded or moldable material, preferably a material capable of being softened under the influence of heat, although dry powder may be employed. Rotatably mounted in the casing 18 and extending through the tank 88 is a shaft 89. Secured to said shaft and lying within the tank 88 is an arm 90 which extends toward the shaft 67. Also secured to the shaft 89, but without the tank 88, and extending downwardly is an arm 91, the lower end of which is forked, this arm lying in the path of movement of a pin 92 extending laterally from one end of a lever 93, which lever is rotatably mounted, intermediate its ends, and on the stud 94 secured to the casing 18. The lower end of the lever 93 is provided with a roller 95 that is in engagement with the operating face of a cam 96 secured to the shaft 23. Secured to the lever 93 is a pin to which is secured one end of a spring, the other end of this spring being secured to the casing 18, and which spring 98 keeps the roller 95 in engagement with the operating face of the cam 96. Oscillating movement of the lever 93 will, therefore, by the pin 91 engaging in the slotted end of the member 92, cause an upward and downward movement of the arm 90 on its pivot point. The end of the arm 90 is provided with a pad 100 and on the end of the arm 90 is pivotally attached a member 101 provided with a pad 102 that cooperates with the pad 100. Associated with the pivoted member 101 is an arm 103 secured to the top of a vertically mounted shaft 104 mounted in suitable bearings in the casing 18, and to the lower end of the shaft 104 is secured an arm 105, the end of which, remote from the shaft 104, is in engagement with the cam 106 secured to the shaft 23. Secured to the shaft 104 adjacent to its lower bearing is an arm 107 to the outer end of which is secured one end of a spring 108 and the other end of this spring is secured to any convenient portion of the machine, this spring tending to maintain the outer end of the arm 107 always in engagement with the operating surface of the cam 106. Rotation of the shaft 23 will cause the cam 106, through the arm 103, to impart an oscillatory motion to the arm 103 and this motion is so timed with relation to the oscillating movement imparted to the shaft 89 that the end of the arm 100 will engage with the pivoted member 101 to move the pad 102 into engagement with the pad 100 when the arm 90 is in its uppermost position, thereby squeezing out of the lacing 64 the surplus molded or moldable material that may have been placed thereon by this mechanism.

Secured to one side of the lower casing 10 by bolts 109 is a bracket 110, and mounted on this bracket below the mechanism above described is a tank 111 acting as a reservoir for a considerable body of the molded or moldable material employed. The tank 111 is provided with a filler cap 112, and extending upwardly from the tank 111 and into the tank 88 is an overflow pipe 112. As shown, the overflow pipe terminates at a point slightly below the upper edge of the tank 88, and when the solution in the tank rises above the same, the overflow flows through the pipe 112 and into the supply tank 111. Also connected with the tank 111 and extending upwardly therefrom is a drain pipe 113 and by means of which all of the solution in the tank 88 may be drained into the tank 111, the drain pipe 113 being provided with a valve 114 for controlling the drainage. Secured to the lower front portion of the supply tank 111 is a pump 115, the inlet end of which is connected by pipe 116 to the bottom of the supply tank 111. To the outlet end of the pump 115 is connected one end of a feed pipe 117, this pipe extending upwardly into the tank 88. The upper end of the pipe is closed by means of a plug 118 and this pipe is provided with a perforation 119 adjacent to the bottom of the tank 88. The pump 115 is provided with a pump shaft 120, a bearing 121 being provided for the upper end of such shaft. Secured to the upper end of the pump shaft 120 is the bevel pinion 122 which meshes with, and is driven by, the bevel gear 123 secured to the outer end of the shaft 23. As clearly shown in Fig. 3, the shaft 23 is supported in a bearing 124 formed on the bracket or arm 125 secured to the under side of a projecting portion of the casing 18.

Rotatably mounted on the shaft 23 and spaced apart from each other are gears 126 and 127 respectively, the gear 126 being larger than the gear 127. Slidably mounted on the shaft 23 between the gears 126 and 127 is a clutch member 128. This clutch member 128 is provided with a pin 129 that extends laterally outward from each side of the clutch member and is adapted to engage in holes or perforations in the gears 126 and 127. The clutch member 128 is provided with an annular groove on its periphery, and in such groove work pins 130, these pins being secured to the ends of the forked member 131 that is pivotally mounted at 132 to the casing 18. The end of the member 131 protrudes outward from the casing 18, and pivotally attached to the protruding end is a connecting rod 133, this rod being pivotally attached to an operating lever 134 pivotally mounted on the support or upright 135. Rotatably mounted in suitable bearings in the casing 18 and parallel to the shaft 23 is a countershaft 136. Secured to the countershaft and spaced apart from each other are gears 137 and 138, the gear 137 meshing with, and being driven by, the gear 126 while the gear 138 meshes with, and is driven by, the gear 127. It is obvious, from the above, that, depending on which of the gears 126 and 127 is engaged by the clutch member 128 depends the rate of speed of the countershaft 136. The gear 137 is provided with a laterally extending crank pin 138 on which is rotatably mounted one end of a connecting rod 139. The other end of the connecting rod 139 is pivotally mounted on an extension 140 of a segmental gear 141 that is secured to a shaft 142 rotatably mounted in suitable bearings in the casing 18. The segmental gear 141 meshes with, and drives, a gear 143 that is secured to one end of a shaft 144 suitably mounted, one end in a bearing 145 in the casing 18 and the other end in a bearing formed in the upper end of the bracket or arm 125 above described as being secured to the under side of a projecting portion of the casing 18. Secured to the end of the shaft 144 by pin 145 is a holder 146, this holder being provided with a plurality of transverse holes through which are slidably and adjustably mounted the tubular members 147. Secured to the free ends of the tubular members 147 and at an angle to the axes thereof is a tubular member 148 through which is threaded the lacing 74 of indeterminate length and which it is desired to form into a plurality of loops of predetermined length. It is obvious from the above description that the shaft 142 will be given an oscillatory movement, the speed of such movement being determined by the clutch member 128 and the gears 126 and 127 and that this oscillatory movement will be imparted to the shaft 144 and that, therefore, there will be an oscillatory movement imparted to the parallel tubes 147. The segmental gear 141 and gear 143 have been so proportioned that the gear 143 will oscillate through substantially a half revolution.

Formed on the lower rear portion of the casing 18 are bearing members 149. Rotatably mounted in such members is a shaft 150 which extends outward on each side of the casing 18 to any desired distance and such extended portion is threaded, one side right handed and the other side left handed. Secure to the floor on each side of the base 10 are uprights 151 and at the upper end of each of such uprights is a bearing member 152. and the outer ends of the shaft 150 find bearings in such members 152. One end of the shaft 150, preferably the right hand end, as viewed in Fig. 1, has secured thereto a crank 153 and by means of which the shaft 150 may be rotated in either direction. Secured to each of the bearing members 149 and extending laterally outward from the casing 18 and spaced apart from, and parallel to, the shaft 150 are shafts 154, these shafts being secured at their ends in the bearing members 152. Slidably mounted on the shafts 154 are frame members 155, there being one of such frame members on each side of the base 10 and parts mounted thereon, as clearly seen in Fig. 1. The lower end of the frame member 155 is drilled and tapped to receive threaded portion of the shafts 150, and it will be obvious that, when the shaft 150 is turned by means of the crank 153, the frame members 155 will be moved simultaneously toward or from the casing 18, the direction of movement being dependent on the direction of rotation of the shaft 150. Secured to the upper end of the casing 18 above the shafts 150 and 154 and having its ends secured in the upper end of the bearing member 152 is a shaft 156. The frame members 155 are provided with bearings which engage with, but slide on, the shaft 156. The frame members 155 are each provided with an upwardly and rearwardly extending arm 157 having bearings 158 at their upper end and in these bearings 158 is slidably mounted a splined shaft 159, this shaft being rotatably mounted in bearings in the upper end of the bearing members 152. The central portion of the shaft 159 is rotatably mounted in the hollow shaft or sleeve 33 above described as being rotatably mounted in bearing members 32 at the upper end of the casing 18. Each of the members 155 is provided with a forwardly extending portion 160, this portion terminating at a point adjacent to the front end of the feed chains 59. Rotatably mounted on a shaft 161 in each of the members 160 is a sprocket 162. Mounted on the splined shaft 159 adjacent to each of the extensions 157 of the frame members 155 and prevented from lateral movement with respect thereto is a sprocket 163, this sprocket being in alignment with the sprocket 162. Over the sprockets 162 and 163 runs a feed chain 164, each link of which is provided with an outwardly extending tooth or arm 165. Pivotally mounted on the outside of each of the extensions 160 is an arm 166 and these arms are provided at their lower free ends with rotatably mounted sprockets 167, these being idler sprockets and engaging with the inner side of the lower reach of the feed chains 164. Formed on each of the members 160 is an outwardly extending lug 168 through which is threaded an adjusting bolt 169 that engages with the pivoted arm 166 for forcing the same downwardly to adjust the tension of the feed chain 164. Secured to each of the shafts 161 is a guide arm 170 which acts to guide the lacing 74 downward into engagement with the feed chain 164. Secured to the extension 160 and on the outer side thereof are plates 171 to which are attached guards 172 that extend over and partially enclose the upper reach of the feed chain 164. On the shaft 156 on each side of the casing 18 are sprockets 173, these sprockets engaging with the lower reach of the feed chains 69. These sprockets 173 are idler sprockets and are placed in this position for the purpose of insuring non-engagement of the shaft 156 by the feed chains 69. Pivotally mounted on the outer face of the ratchet 64 is a pawl 175, which pawl engages with a ratchet 176 keyed to the shaft 159. The pawl 175 and ratchet 176 insure that the shaft 159 will be intermittently rotated in synchronism with the intermittent rotation of the turret plate 34. The driving mechanism for the feed chains 69 is so proportioned relatively to the driving mechanism for the feed chains 164 that said chains move in the same direction and at the same speed and this speed is so proportioned to the oscillatory movement imparted to the parallelly arranged tubular members 147 as to allow the tubes 147 to make a complete oscillatory movement for each intermittent forward step or movement of the chains. In this oscillatory movement of the members 147, therefore, the lacing 74 of indeterminate length is laid between two adjacent teeth 165, being guided therein by the member 170, thence in the space B between the members 71 and 73 on the feed chains 69, thence between two adjacent teeth 165 on the opposite feed chain 164, and when this position has been attained, an intermitent forward step is imparted to the feed chains 164 and 69. The space B in which the lacing 74 has been placed is now closed up by the onward movement of the chain 63 and the next link of the chain has its portion 73 separated from the pin 71 to provide another open space B and at this instant the parallel tubes 147 swing back, a loop of the lacing 74 being placed around the next rearward tooth 165 and the above sequence of operations may be repeated indefinitely.

Secured to the rear end of the base 10 is a member 174, this member extending upwardly and rearwardly around the turret plate 34 and thence forwardly above the feed chains 69, as clearly shown in the drawings. Above the feed chains 69 and on the member 174 is a boss 177 in which is secured by set screw 178 a downwardly depending rod or shaft 179. This rod or shaft 179 has pivotally attached at its lower end a rod 180 secured to a casing 181. This casing contains a heating device which lies parallel to, but spaced slightly above, the plane in which lies the plurality of lengths of lacing 74 that extends between, and are held by, the feed chains 69. This casing 181 is provided with a handle 182 at its forward end. At the forward end of the horn of the member 174 and on the lower surface thereof is pivoted a connecting rod 183, while pivotally attached to the upper forward end of the casing 181 is a connecting rod or plate 184. These connecting rods or plates 184 are pivotally attached at their other ends by a threaded bolt 185 having formed thereon a handle 186 and by means of which the same may be operated. The height of the rear end of the casing 181 may be adjusted by means of the set screw 178 and boss 177 and the front end may be adjusted by means of the connecting rods or plates 183 and 184 and the threaded member 185.

Secured to the bearing ends 157 of the members 155 against lateral movement therefrom are circular members 187, these members being rotated by, but slidable on, the splined shaft 159. Secured to, or formed integral with, one face of each of the circular members or feed wheels 187, but spaced apart therefrom, is a substantially circular member 188. In the periphery of the circular member or feed wheel 187 and symmetrically disposed about such periphery are notches 189, one side of each of which notches being formed by a tooth 190. Symmetrically disposed about the periphery of the circular member 188 and in alignment with the notches 189 are V notches 191. Adjacent to each of the aligned notches 189 and 191 and extending between the members 187 and 188 are shafts 192 and rotatably mounted on each of said shafts is a locking plate or member 193, these members being provided with a face 194 adapted to engage with the side of the tooth 190 and with one face of the notch 191, as clearly shown in Fig. 7. On each of the members 193 is provided a laterally extending pin 195 adapted to engage with the joining point of one of the spokes of the member 187 with the peripheral rim, as clearly shown in Fig. 7, to limit the movement of the contacting face 194 of the member 193 with the tooth 190 and one of the faces of the notch 191. The end of the member 193 has attached thereto one end of a coil spring 196, the other end of this spring being attached to a spoke of the member 187 and this spring tends to urge the face 194 of the member 193 into engagement with the tooth 190 and one face of the notch 191. Secured to one face of each of the members 155 is a cam 197 in position to engage with the laterally projecting pins 195 for the purpose of rotating the member 193 on their shafts 192 and to move the same against the tension of the spring 196 from a position where the face 194 is in engagement with the tooth 190 and one face of the notch 191 and into such position as will expose the notches 189 and 191 and allow the lacing 74 to be placed or fitted into such notches. Referring to Fig. 7, it will be noted that the cam 197 is so positioned relative to the feed chains 164 that the aligned V slots 189 and 191 are cleared for action at a point A which is substantially less than 90° removed from the point marked B, it being assumed that the members 187 and 188 are rotating in the direction of the arrow shown in such Fig. 7. Further, it will be obvious that such aligned notches are maintained cleared for action until after they have passed upward beyond the upper reach of the feed chains 164, or until the pins 195 ride off the end of the cam 197 at the point indicated by C. It will be apparent, therefore, that the feed chain 164, moving in the direction of the arrow shown in Fig. 7, that the lacing 74 will be fed into the aligned notches 189 and 191 during the simultaneous movement of the feed chains 164 and rotating members 187 and 188 and that such lacings will be fed upward off the teeth 165 of the chain 164 and will thus be transferred from the feed chain 164 to the rotating members 187 and 188. Immediately the pin 195 has passed off the cam 197 at the point C, the spring 196 will rotate the member 193 about its shaft 192 and bring the face 194 thereon into engagement, as near as may be possible, with the face of the tooth 190 and one face of the notch 191 and will firmly grip the lacing 74 therebetween. It will be understood, of course, that the elements 190, 191, and 193 grip a lacing adjacent to the looping point thereon about the tooth 165 on the feed chains 164 and that, at this time, the ends of the lacing are held firmly gripped by the cooperating die members 46 and 58 on the die carriers mounted on the rotatable carrier 34.

Secured to the lower ends of each of the members 155 and projecting rearwardly and upwardly therefrom is an arm 198. Secured to the upper end of the arm 198 and extending vertically upward therefrom is a shaft 199. Rotatably mounted on said shaft 199 on top of the member 198 is a radially extending arm 200 for a purpose to be hereinafter described. Also rotatably mounted on the shaft 199 above the arm 200 is a circular plate 201 to the under side of which is secured a ratchet 202. Secured to the circular plate 201 by screws 203 are arms 204, these arms extending radially outward and thence upward and outward, the upper ends being pointed, as indicated at 205. These arms 204 are symmetrically disposed about the circular plate 201 and form a basket-like structure. The arms 204 are of such shape and length and are so positioned as to have the points 205 thereof brought successively into position with the rotating member 187, as clearly shown in Figs. 1 and 7, such arms 204 acting as "picking off" means for the lacings 74 as they are brought around into position by the rotating members 187 and 188. Secured to the top of the shaft 199 by nuts 206 is a member 207, the outer free end of which terminates adjacent to that one of the upper ends of the members 204 of the curved ends 205 that is adjacent to the rotatably mounted members 187. To the upper free end of the member 207 is pivotally attached a spring member 208 which, as will be seen from an inspection of Fig. 2, bears against the inner face of the free end of one of the members 204, this construction acting as a friction means through which the lacing is fed or may be dropped.

Pivotally mounted on the member 174 is a member comprised of a pair of arms 209, one located on each side of the member 174 and forming a guideway through which the die blocks 42 are fed, as clearly shown in Fig. 18. The arms 209 are secured together adjacent to the pivotal point thereof by a plate 210 which lies in the path of movement of, and is adapted to be engaged by, a curved plate 211 secured to the end of the members 42 by screws 212, the member 211 in the rotating movement of the die plate 34 causing a rotative movement of the arms 209 about their pivot point. On the edge of the arms 209 adjacent to the members 42 are secured or formed stripper plates 213, the forward face of which engages with the lacings 74 to guide the same downwardly therealong and toward the pivot point. Rotatably mounted on the pivot of the arms 209 and adjacent to said arms are levers 214, one end of which extends forwardly and upwardly, as clearly shown in Fig. 18, this portion being provided with a face 215 that corresponds with, and is adapted to be engaged by, the faces of the stripper plates 213. The rearwardly extending ends of the levers 214 are provided with a screw 216 to which is attached one end of spring 217, the other end of the spring being attached to a pin 218 secured to the member 174. Formed integral with the member 174 and on each face thereof is a lug 219 through which passes an adjusting screw 220, the end of this adjusting screw engaging with the extreme rearward end of the levers 214 and by means of which the upward movement of the forward levers 214 may be limited and the spring 217 normally holds the extreme rear end of the lever 214 in engagement with the end of the adjusting screw 230. Pivotally mounted on the member 174 above the pivotal point of the arms 209 is a lever 221, one end of which extends forward through a slot 222 in the member 174 and into position to pass through the slot 49 formed at one side of the member 42. Pivotally attached to the rear end of the lever 221 is the upper end of a curved connecting rod 223, this member extending downwardly adjacent to the member 174 and is pivotally attached at its lower end to a crank 224 secured to a shaft 225 that is rotatably mounted in a bearing 226 secured to the base 18. Secured to the end of the shaft 225 remote from the crank 224 is a slotted crank arm 227 and adjustably and pivotally mounted in the slot in said crank 227 is one end of a connecting rod 228. This connecting rod 228 has secured at its forward end a laterally extending shaft 229, and pivotally mounted on the shaft 229 is a connecting arm 230 that is pivotally mounted at its lower end on a shaft 231 secured to, and extending laterally outward from the base 18. On the shaft 229 between the connecting rod 228 and the arm 230 is a pawl 232 which engages with a ratchet 233 rotatably mounted on the shaft 231. Secured to the ratchet 233 and centrally located with respect thereto is a pinion 234 which meshes with, and drives, a gear 235 that is rotatably mounted on a shaft 236 that lies parallel with the shaft 231 and is secured to, and extends laterally outward from, the base 18. This gear 235 rotates in the direction of the arrow shown in Fig. 18. Secured to the gear 235 and extending laterally outward therefrom are pins 237, these pins being arranged as may be desired, and secured to such pins, but removable therefrom, are cylindrical members 238. Rotatably mounted on the bearing blocks 149 and parallel to the shaft 150 is a shaft 239, and secured to the end of such shaft is a member 240 adapted to be engaged by either of the members 238. Referring to Fig. 18, it will be obvious that, if the gear 235 is rotated in the direction of the arrow shown, the shaft 239 will be rotated in the opposite direction, as indicated by the arrow associated therewith, and this rotative movement will continue until the contacting cylinder 238 has moved off the member 240. Secured to the shaft 239 and extending radially outward therefrom is an arm 241. This arm is provided with a perforation at its free end in which is attached one end of a spring 242, the other end of this spring being attached to a pin 243 on the base 10. The arm 241 and spring 242 tend to rotate the shaft 239 in the direction opposite to that indicated by the arrow in Fig. 18, or in an anti-clockwise direction so to bring the lower end of the member 240 into the path of movement of the cylindrical members 238. Also secured to the shaft 239 is an arm 244, and pivotally attached to the free end of said arm is one end of a connecting rod 245. The other end of this connecting rod is pivotally attached to the lever 200 above described as being rotatably mounted on the shaft 199 over the arm 198. Pivotally mounted on the upper surface of the lever 200 and on each side of the shaft 199 is a spring pressed pawl 246, which pawls engage with the ratchet 202 secured to the under face of the circular plate 201. As the member 240 is engaged by the cylinders 238 to rotate the shaft 239 in the direction of the arrow shown in Fig. 18, the arm 245 will be moved in the direction of the arrow indicated in Figs. 11 and 12 and it will be seen that this action will allow relative movement to take place between the pawls 246 and the ratchet 202. When the shaft 239 has rotated to the extreme limit, as determined by the contacting engagement of the cylinder 238 and the member 240, it is assumed that the pawls 246 will have engaged the next rearward tooth of the ratchet 201 and, therefore, at this time the spring 242, having been placed under tension by such rotation of the shaft 239, will be allowed to contract and the arms 245 will be moved rapidly in the direction opposite to that indicated by the arrow in Figs. 11 and 12 and will rotate the ratchet 202 and, therefore, the plate 201 and parts carried thereby through a predetermined portion of a revolution of the shaft 199, this distance depending on the number of arms 204 mounted on the said circular plate 201 and, therefore, bringing the next succeeding arm 204 into association with the rotating cylindrical plates 187. The mechanism just described constitutes a counting mechanism for the apparatus and the ratchet 233, pinion 234, and gear 235 are so designed and proportioned that any desired number of lacings 74 may be placed in position on any one of the arms 204 before the tripping of the member 240 by the cylinders 238. As, however, lacings are usually arranged in lots, I have designed the elements referred to so that the arm 245 will be operated to rotate the plate 201 through a predetermined portion of a revolution after the collecting on the arm 204 of a gross of lacings 74.

Formed integral with the member 174 on the front face thereof is a bearing boss 247. Rotatably mounted on a shaft 248 on such bearing member 247 is a brake member 249. The outer or upper face of this member is provided with a brake lining 250 lying in a cylinder of which the shaft 159 is the center. Associated with the brake member 249 is an adjusting screw 251 that contacts with the upper surface of the member 174 and by means of which the relative position of the brake member 249 with respect to the die carriers 42 may be adjusted. The brake lining 250 is adapted to be engaged by the curved plate 211, above described as being secured to the front end of the members 42, and the engagement of the curved plate 211 by such brake linings prevents overrun of the rotating disc 34.

In addition to the operating lever 134 above described as being carried by the standards 135, there is mounted on the said standard an instrument board 260 and on such instrument board is a control switch 261 for the motor 12. To secure the standard 135 rigidly with respect to the above described apparatus, there extends between the base 10 and the standard a connecting member 262. Extending upwardly and forwardly from the standard 135 is an arm 263 provided at its top end with an eye or groove 264 through which passes the lacing 74, this lacing being of indeterminate length and contained in a holder or carrier 265. Mounted on the standard 135 is a member 266 and on this member is a groove or eye 267 having associated therewith a safety device by means of which the control lever 134 may be operated to prevent injury to the mechanism caused by the passage to the apparatus of lacing that is imperfect, or from any other cause. This safety device forms no part of the present invention and has not been illustrated in detail.

If we assume that the apparatus has been constructed as above described and that the end of the lacing 74 of indeterminate length has been laid from the container 265 through the members 264, 267, and through the tubular member 148 on the oscillatory arm 147, the end being passed into the space B between elements 71 and 73 on such chain 69. Power is turned into the motor 12 by the proper operation of the controlling switch 261 to cause rotation of the vertically arranged shaft 17. The reservoir or supply tank 111 is filled with molded or moldable material through the filler cap 112 and the heating element contained within the casing 181 is placed in operation. The operator now takes the controlling lever 134 and through the medium of the connecting rod 133 operates the clutch mechanism, moving such clutch mechanism into engagement with either the gears 126 or 127, depending on the speed at which it is desired to run the machine. This action causes rotation of the shaft 36 and an oscillatory movement of the shaft 144, to the front end of which is attached the tubular member or arm 147. The plate 134 carrying the die members is rotated step by step, as above described, and as illustrated in Figs. 4 and 5, and this step by step motion takes place in synchronism with the oscillatory movement of the arm 147. Also in synchronism with the oscillatory motion of the arm 147 there is imparted an intermittent movement of the spaced feed chains 69 so that, as the chain 69 moves in the direction of the arrow shown, the length of the lacing 74 will be fed into the aligned spaces B in such spaced chains, and at the next oscillation of the arm 147, another succeeding pair of aligned spaces B will be brought into position to receive a loop of the lacing 74 of indeterminate length. As the arm 147 oscillates, the loop formed at the end of the travel of the arm 147 will be caught onto a tooth 165 on the chain 164, being fed into engagement with such tooth by the guide arms 170 so that the lacing will be divided temporarily into lengths determined by the distance apart of the spaced chains 164. This distance between chains 164 may be made any by rotation of the handle 153 which causes a rotative movement of the right and left hand screw 150 on which the mounting for the chains 164 is located. To compensate for the varying distance between chains 164, the arm 147 is made adjustable on the end of the shaft 144. The spaced chains 164 are operated in synchronism with the spaced feed chains 69 and, therefore, such chains move rearwardly with an intermittent step by step motion. In synchronism with the rearward step by step movement of the feed chains 69, there is provided, as above described, the mechanism for operating the device for applying molded or moldable material, this device dipping into the molded or moldable material, applying such material to a predetermined length of lacing lying between the feed chains 69, and the squeezing out from such lacing the excess molded or moldable material. In order that there shall be a constant level of material in the tank 88, the pump 115 is continuously operated, during the working of the machine, and material is being pumped into such tank 88 from the supply tank 111, any excess of material passing downward into the supply tank through the overflow pipe 112. This method is advantageous as it keeps the molded or moldable material in constant agitation and makes a more uniform solution. The lengths of lacing are being fed rearwardly of the machine and that portion of the lacing between the feed chains 69 and containing the molded or moldable material passes through the heated zone caused by the heating element within the casing 181 and the heat, as well as the speed of the machine, is so regulated that the saturated portion of the lacing is in the best condition for subsequent operations being performed thereon. Operating in synchronism with the feed chains 69 and 164 is a carrier disc 34 located in the rear of, and between, the feed chains 69, and the circular members 187. The feed chains 69 feed the saturated and conditioned portion of the lacing into the path of movement of the molds carried by the carrier plate 34 and into a position to be engaged by the groove 48 on the die block 46. One of the plurality of die structures is, at each step of the machine, moved upward across the path of movement of the feed chains 69 and carries the length of lacing 74 upward around the shaft 159 as a center, or in the direction of the arrow shown in Fig. 3. As the die structure brought into operation moves upward after engaging with the lacing 74, the protruding pin or roller 43 thereon, engaging with the cam 62, forces the portion 50 of the die from the position shown, for example, in Fig. 16, to that shown in Fig. 17, and with the die member 55 thereof engaging with the die member 46 and forming, by the aid of the groove 48, the saturated portion of the lacing 74. After the die portion 55 has engaged with the die portion 46, such portions are held in this position during practically a half revolution of the die carrying plate 34, thus giving the molded or moldable material time to set. Simultaneously with the movement to the right of the die member 55, there was brought into action the cutting member 58 associated with the die member 55 and this member, fitting into the groove 47 between cooperating die members 46, severed the lacing of indeterminate length by cutting out therefrom a portion having a length equal to the width of the slot 47. Simultaneously with the upward movement occurs an upward movement of the stripping mechanism described in connection particularly with respect to Figs. 6 and 7, the loops of lacing 74 being fed into the slots or grooves formed in the cooperating plates 187 and 188 and such loops are gripped between the faces 190 and 191 of said circular members and the face 194 of the pivotally mounted member 193. By the above described operation, therefore, the loops of lacing on each side of the rotating die carrier disc 34 are fed off the feed chains 69 and 164 and are now being carried around by the dies on the carrier disc 34 and by the cylindrical members 187 and 188. As the lacing members 74 are fed around, the end portions thereof gripped between the die members 55 and 46 are fed downwardly, each into engagement with the front face of the member 213, being guided thereagainst by the members 215. As the die carrier 34 continues this rotation, the top edge of the curved plate 211 engages with the connecting plate 210 that connects the pivoted arms 209 and rotates that structure shown in Fig. 9 about its pivot point, this movement rotating the lever 214 on its pivot point. As the die carrier 42 moved downward, the forward end of the lever 221 engaged with that portion of one of the lacings 74 that extends across the slot 49 in the die member 42 and the lever 221 rotated on its axis. This rotative movement of the lever 221 caused, through the connecting rod 223 and ratchet and pawl 233 and 232 respectively, a rotative movement of the gear 235 on the shaft 236 and caused a certain amount of rotative movement of the shaft 239 in the direction of the arrow shown in Fig. 18. As the carrier plate 34 continued its rotation, the projecting pin or roller 43 associated with the particular die carrier 42 that is in action, engages with the cam 60 which causes a movement of the die member 55 away from the die member 46. The tipped end of the lacings 74 being thus released from pressure, the spring 217 is allowed to operate and the tipped end of the lacings "snapped" out of engagement with the groove 48 in the die member 46 and the members 213 and 214 assume the position shown in Fig. 18. During the operations just described, the circular members 187 and 188 have reached a point where the pointed end 205 of one of the members 204 will engage under or in the loop of the lacing 74, and on the continued movement of the two circular members 187 and 188 in the direction of the arrow shown in Fig. 7, the loop will be fed onto the member 204 beyond the spring plate 208. When the laterally projecting pin on the pivoted member 193 that is in action engages with the cam 197, the face 194 of such member 193 will be moved away from the faces 190 and 191 and the lacing 74 will be released entirely from the plates 187 and 188 and will drop into position on the member 204, the central portion of the lacing 74 engaging with the member 204. This sequence of operations will continue, the gear 235 rotating through a small angular distance for each lacing tipped and gradually moving the lower end of the member 240 to the left, as shown in Fig. 18, to rotate the shaft 239. This will cause a gradual movement of the connecting arm 245 to the left, or in the direction of the arrow as shown in Figs. 11 and 12, until the pawls 246 on the lever 200 engage with the next succeeding tooth on the ratchet 202. This occurs when a gross of 144 lacings have been positioned on the arm 204 in position adjacent to the rotating plates 187 and 188, and at this instant it is assumed that the lower end of the member 240 rides over the cylinder 238. The spring 242, being tensioned during this continued movement, operates to rotate the shaft 239 in a reverse direction to that above described and the connecting arm 245, moving to the right, as shown in Figs. 11 and 12, rotates the plate 201 through one sixth of a revolution, as shown on the drawing, to bring the next succeeding arm 204 into position adjacent to the rotating plates 187 and 188.

The apparatus herein described is an improvement in many respects over the apparatus described and claimed in my Patent No. 1,486,838, granted March 11, 1924, although the main features of construction of the present apparatus and the apparatus above referred to in my copending application are substantially identical. While I have, therefore, necessarily shown and described the preferred embodiment of my present invention somewhat in detail, it is to be understood that I may vary the size, shape, and arrangement of parts within wide limits without departing from the spirit of the invention.

Having thus described my invention, what I claim as new is:—

1. A lace tipping machine comprising, a rotatable die carrier, feed chains associated therewith, and other feed chains spaced apart from and associated with said first feed chains.

2. A lace tipping machine comprising, a rotatable die carrier, feed chains associated therewith, and other feed chains arranged parallel to, spaced apart from and associated with said first feed chains.

3. A lace tipping machine comprising, a rotatable die carrier, feed chains associated therewith, means for moving said elements in synchronism, and other feed chains spaced apart from and associated with said first feed chains.

4. A lace tipping machine comprising, a rotatable die carrier, feed chains associated therewith, other feed chains spaced apart from and associated with said first feed chains, and means for moving said elements in synchronism.

5. A lace tipping machine comprising, a rotatable die carrier, feed chains associated therewith, other feed chains arranged parallel to, spaced apart from and associated with said first feed chains, and means for moving said elements forwardly by a step-by-step movement and in synchronism with each other.

6. A lace tipping machine comprising, a rotatable die carrier, feed chains associated therewith, other feed chains spaced apart from and associated with said first feed chains and arranged to hold loops of lacings being fed through the machine, and means for stripping the loops of lacings from the other feed chains.

7. A lace tipping machine comprising, a rotatable die carrier, feed chains associated therewith, other feed chains spaced apart from and associated with said first feed chains and arranged to hold loops of lacings being fed through the machine, and means for stripping the loops of lacings from the other feed chains at a predetermined point in the travel of the lacings.

8. A lace tipping machine comprising, a rotatable die carrier, feed chains associated therewith, other feed chains spaced apart from and associated with said first feed chains and arranged to hold loops of lacings being fed through the machine, and a rotatably mounted member for stripping the loops of lacings from the other feed chains.

9. A lace tipping machine comprising, a rotatable die carrier, feed chains associated therewith, other feed chains spaced apart from and associated with said first feed chains and arranged to hold loops of lacings being fed through the machine, and a rotatably mounted member for stripping the loops of lacings from the other feed chains at a predetermined point in the travel of the lacings.

10. A lace tipping machine comprising, a rotatable die carrier, feed chains associated therewith, other feed chains spaced apart from and associated with said first feed chains and arranged to hold loops of lacings being fed through the machine, a rotatably mounted member for stripping the loops of lacings from the other feed chains, and means for operating said members in synchronism with the feed chains and die carrier.

11. A lace tipping machine comprising, a rotatable die carrier, feed chains associated therewith, other feed chains spaced apart from and associated with said first feed chains and arranged to hold loops of lacings being fed through the machine, a rotatably mounted member for stripping the loops of lacings from the other feed chains, means for operating said member in synchronism with the feed chains and die carrier, and means for stripping the lacings from said rotatable member.

12. A lace tipping machine comprising, a rotatable die carrier, feed chains associated therewith, other feed chains spaced apart from and associated with said first feed chains and arranged to hold loops of lacings being fed through the machine, a rotatably mounted member for stripping the loops of lacings from the other feed chains, means for operating said member in synchronism with the feed chains and die carrier, means for stripping the lacings from said rotatable member, and a counting mechanism associated with said last named means.

13. A lace tipping machine comprising, a rotatable die carrier, feed chains associated therewith, other feed chains spaced apart from and associated with said first feed chains and arranged to hold loops of lacings being fed through the machine, a rotatably mounted member for stripping the loops of lacings from the other feed chains, means for operating said member in synchronism with the feed chains and die carrier, means for stripping the lacings from said rotatable member, a counting mechanism associated with said last named means, and means for operating the same after a predetermined number of lacings have been collected thereby.

14. A lace tipping machine including, in combination, a rotatably mounted carrier, a plurality of dies carried thereby, and a stripping mechanism for stripping the lacings from the dies.

15. A lace tipping machine including, in combination, a rotatably mounted carrier, a plurality of dies carried thereby and radially arranged thereon, and a stripping mechanism for stripping lacings from the dies.

16. A lace tipping machine including, in combination, a rotatably mounted carrier, a plurality of dies carried thereby, and a single stripping mechanism for stripping lacings from the dies.

17. A lace tipping machine including, in combination, a rotatably mounted carrier, a plurality of dies carried thereby, and radially arranged thereon, and a stripping mechanism for stripping lacings from the dies adapted to be brought successively into association with the dies.

18. A lace tipping machine including, in combination, a rotatably mounted carrier, a plurality of dies carried thereby, and radially arranged thereon, and a stripping mechanism for stripping lacings from the dies adapted to be brought successively into association with the dies at a predetermined point in the travel of the dies.

19. A lace tipping machine including, in combination, a rotatably mounted carrier, a plurality of dies carried thereby, a counting mechanism, and means for operating said counting mechanism from the dies.

20. A lace tipping machine including, in combination, a rotatably mounted carrier, a plurality of dies carried thereby, a counting mechanism, and means for operating said counting mechanism from the dies and at a predetermined point in the travel of the dies.

In testimony whereof, I have signed my name to this specification.

CARL A. MATSON.